April 28, 1959 D. K. REYNOLDS Re. 24,641

MAGNETIC RECORD TESTING MEANS

Original Filed Nov. 23, 1953

INVENTOR.
DONALD K. REYNOLDS
BY Lyon & Lyon
ATTORNEYS

United States Patent Office

Re. 24,641
Reissued Apr. 28, 1959

24,641

MAGNETIC RECORD TESTING MEANS

Donald K. Reynolds, Seattle, Wash., assignor, by mesne assignments, to General Electric Company, New York, N.Y., a corporation of New York Original No. 2,793,344, dated May 21, 1957, Serial No. 393,869, November 23, 1953. Application for reissue January 16, 1958, Serial No. 709,429

9 Claims. (Cl. 324—34)

Matter enclosed in heavy brackets [ ] appears in the original patent but forms no part of this reissue specification; matter printed in italics indicates the additions made by reissue.

This invention relates to magnetic recording and, more particularly, to an improved system and apparatus for testing a magnetic recording medium, such as magnetic tape and the like.

Present day information handling machines employ, as a storage device, both magnetic tapes and magnetic drums. In their manufacture, great lengths are gone to to insure that the tape will be as free from imperfections in the magnetic layer as possible. However, these defects or nodules, as they are called, do appear, despite these precautions on the part of manufacturers. Present day information handling machines must be accurate, since they are being employed now in accounting systems and inventory control systems, and, indeed, even in banking systems. Therefore, great lengths are gone to, to insure their accuracy. Error checking and error correcting codes are employed, and, in many instances, there is duplication of apparatus and programming of a problem in a number of different ways, in order to check the operation of the machine.

As a result of these requirements for accuracy storage mediums, such as magnetic tapes, are inspected thoroughly, and any defects therein uusally mean that the tape cannot be used. If defects, or nodules, are unobserved, the data is incorrectly stored at that location and is a constant source of error for the machine.

One method for checking tape which is known and used is to write a pulse pattern of a single binary digit over the entire tape. These pulses are laid down in the plurality of tracks or channels on the tape in which normally information is to be recorded. Then the pattern of pulses is read out simultaneously by means of a magnetic transducer head positioned over each channel. The outputs from these heads are applied to a number of gates and to a counter, which function to actuate the counter when all the heads do not simultaneously provide an output. Thus all the imperfections on the tape which prevent a proper recording of a pulse are counted except that more than one nodule simultaneously present under the heads is counted as one defect. This does not matter, since for the purpose of recording a defect in one or all of the channels at a given location, since it is customary to record binary information in parallel, renders that location useless. The tape is then either accepted or rejected, based upon the nodule count and the amount of error tolerance permitted. If accepted with a maximum number of nodules errors are bound to occur, but this is cheaper than throwing the tapes away until a perfect one is found.

An object of the present invention is to provide a system for identifying nodules in a magnetic recording medium so that errors due thereto may be avoided.

Another object of the present invention is to provide apparatus for identifying defects in a magnetic recording medium, so that less perfect recording mediums may be employed and still provide error-free operation.

Still another object of the present invention is to provide a system for checking defects in magnetic tape which is novel and useful.

Another source of trouble in magnetic tape is known as skew. The present system for utilizing tape is to use a plurality of tracks and simultaneously record pulses, representative of binary digits, in these tracks by means of magnetic heads which are aligned transversely across the tape and with each head positioned over each track. The tape is subject to a number of stresses, both from rapid starting and stopping and even in reading. Accordingly, when the tape is again passing under the magnetic heads, one section or side of the tape may be stretched more than the other. This causes the pulses in the tracks to be misaligned to a certain extent. Accordingly, instead of pulses being simultaneously read from the tape exactly as they were recorded on the tape, there is a delay between the reading of the digit in each of the tracks which is proportional to the stretch or skew which the tape has. Another skew difficulty results from the tape passing the aligned heads at an angle which is different in recording than in playback. This effect is a function of the tape transport mechanical design.

An object of the present invention is to provide a system for compensating for skew.

Another object of the present invention is to provide a system for determining the amount of skew assumed by a given tape.

The above and further objects of the invention are achieved in a system wherein the outputs of the magnetic reading heads are applied through an "or" gate to a first variable time delay circuit to the trigger a first pulse generator. The output of the first pulse generator is employed as a data sampling pulse. The magnetic head outputs are also applied through an "and" gate to a second "and" gate as an inhibiting input to that second "and" gate. The pulse generator output is also applied to the second "and" gate. The output of the second "and" gate is applied to a counter and also to a recording head. Accordingly, if tape has been prepared by recording a pattern of pulses in every track, in reading the tape this invention will count all the defects on the tape and will record a pulse or train of pulses, which locate this defect. With such defects being marked in this manner along a "nodule marking channel," it is a simple matter to read the pulses on the nodule marking channel and employ them to prevent recording on the tape location where the nodules are marked. In this manner, errors in reading from tape due to nodules are eliminated. Also, even though a tape has a large number of defects, it can still be employed and provide substantially error-free operation.

The novel features that are considered characteristic of this invention are set forth with particularity in the appended claims. The invention, itself, both as to its organization and method of operation, as well as additional objects and advantages thereof, will be best understood from the following description when read in connection with the accompanying drawings, in which:

Figure 1:
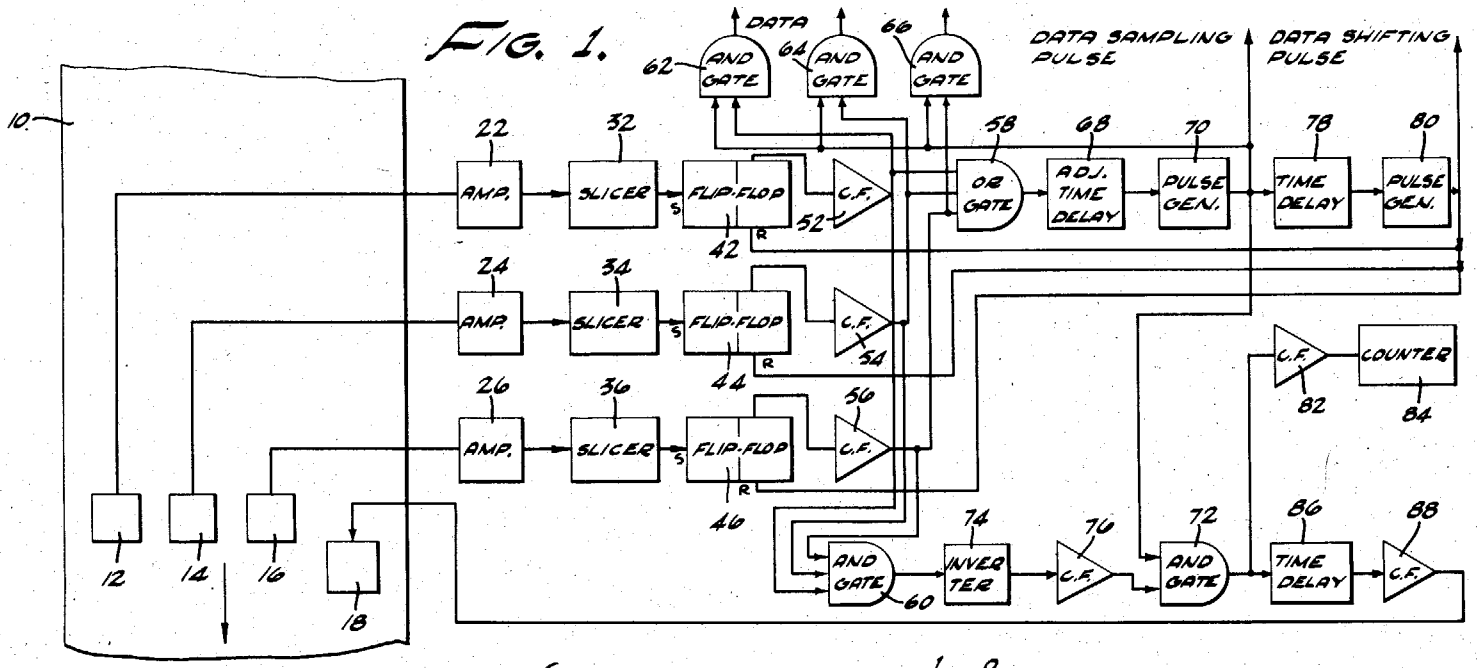
Figure 1 is a schematic diagram of an embodiment of the invention.

Reference is now made to Figure 1, where for illustration of the invention it is shown being employed with a section of magnetic tape 10 having a plurality of recording channels. As an illustrative embodiment, four channels are considered, three of which may be considered data recording channels, and the fourth the nodule marking channel. The tape passes underneath the magnetic transducer heads represented by rectangles. The three heads 12, 14, 16 for the data channels are substantially aligned and the head 18 for the nodule channel is displaced slightly from the other heads in the direction of motion of the tape 10. The alignment of the heads can be transverse, as shown, or they may be positioned in a skew fashion if desired. They must be positioned, however, so that a recorded digit in a binary number passes under each one of them substantially simultaneously. The tape is prepared for testing by writing pulses in the data recording channels along the entire length of the tape. These pulses may all be representative of binary ones or binary zeros. The important thing is that the same pulse be written by means of the substantially transversely aligned data heads in the data tracks. The writing may be done by either using the same heads used for reading and writing or by using separate heads for each. The tape is then run past the four heads shown in Figure 1. The outputs from the three data heads 12, 14, 16 are applied to three high-gain amplifiers 22, 24, 26, each of which amplifies the signal picked up and applies it to a separately associated network known as a slicer 32, 34, 36.

The slicer is a circuit for permitting only that portion of a signal to pass through which exceeds a certain minimum level and which does not exceed a maximum level. A suitable circuit of this type is described and shown on pages 45 and 46 of the book Waveforms by Chance et al., published by McGraw-Hill Book Company in 1949. The output of each slicer is applied to a separate flip-flop circuit 42, 44, 46. These flip-flop circuits are of the well known two-tube Eccles-Jordan type and may be found described on pages 595 to 597 of the book Radio Engineering by Terman and published by McGraw-Hill Book Company in 1947.

Each trigger circuit has one input terminal designated by "S" as the set terminal, to which the application of positive pulses causes the flip-flop to have one of its tubes conducting and the other tube nonconducting. Output is taken from the anode of the conducting tube and applied to a separate cathode follower stage 52, 54, 56. The other tube grid of the trigger circuit may be considered as a reset grid designated as "R" input terminal, since application of a positive pulse to the other tube grid resets the flip-flop to its initial condition from which it was transferred by application of a pulse to its "S" input. The initial condition may be called a nonindicating condition and the condition to which the flip-flop is driven by the application of a pulse to its set terminal may be designated as the indicating condition. Accordingly, when the flip-flop in each channel is driven to the indicating condition by an output from its associated slicer, an output is applied to the associated cathode follower. Each cathode follower 52, 54, 56 applies its output to (1) an "or" gate 58; (2) a first "and" gate 60; and (3) a data reading "and" gate 62, 64, 66.

"Or" gates and "and" gates are well known in the art, and a suitable type for each may be found described in an article entitled Diode coincidence and mixing circuits for digital computers by Tung Chang Chen in the Proceedings of the IRE, May 1950, pages 511 to 514.

An "and" gate is a coincidence device which provides an output only when all its inputs are present simultaneously. An "or" gate is a device or circuit which provides an output when any one of its inputs are present. Thus, the "or" gate 58 provides an output when it receives an input from any one of the channels from the magnetic transducer heads. This output is applied to an adjustable time delay circuit 68. An adjustable time delay circuit of a suitable type may be found described in Electronic Instruments by Greenwood et al., published by McGraw-Hill Book Company and may be found on pages 591 et seq.

This circuit is merely a one-shot multivibrator which provides an output pulse at a time later than the application of an input pulse by an interval which can be determined or controlled by adjusting the circuit component values.

The output of the adjustable time delay circuit 68 is applied to a pulse generator 70. This pulse generator is well known in the art and may be a blocking oscillator of the type described in chaper 6 of the above noted book Waveforms. The output of the pulse generator is applied as a second input to the data "and" gates 62, 64, 66 and also to a second "and" gate 72. The second "and" gate has as its other input the output of the first "and" gate 60, which has been inverted through a phase inverter 74 and then applied through a cathode follower stage 76. This inverted input serves to inhibit the operation of the second "and" gate 72, which otherwise will pass the output of the first pulse generator. This type of "and" gate is known as a "but-not" gate, in that it will pass one of its inputs but not both. This type of "and" gate is found described by Felker in an article in Electrical Engineering for December 1952, entitled Typical block diagram for a transistor digital computer.

The first pulse generator output is also applied to a second time delay circuit 78, which is substantially similar to the first. The output of the second time delay circuit 78 is applied to a second pulse generator 80 which also is similar to the first blocking oscillator. Its output is utilized to reset the flip-flop circuits 42, 44, 46 in each channel. Its output, herein referred to as a "data shift pulse" has other uses as well. If the apparatus shown is used solely for the purpose of reading the tape, the first and second "and" gates 60, 72 and the apparatus following them is not required; data is read as the outputs of each one of the data "and" gates 62, 64, 66. The "data shift pulse" may be used to transfer the information read from the data "and" gates into subsequent apparatus, to clear it to receive new data. Also, both the data sampling pulse and the data shift pulse may be employed as clock pulses having a given desired interval between them as determined by the time delay networks. These clock pulses may be employed in whatever apparatus in which the particular system shown and described herein are incorporated.

The first and second "and" gates operate to provide pulses for marking a nodule channel on the tape. The first "and" gate 60 only provides an output when all the pulses are present and read from the data channels. The second "and" gate 72 provides an output pulse any time there is a pulse in one of the data channels being read. In view of the operation of the first time delay network 68, the data sampling pulse does not occur until the data pulse has existed for a desired interval. Accordingly, the second "and" gate can be inhibited by the first "and" gate and will not pass the subsequently occurring data sampling pulse if all the pulses occur in the data track. If one of them does not occur, due to the presence of a nodule or other imperfection, the data sampling pulse passes through the second "and" gate and then is applied by means of a cathode follower 82 to a counter 84 to be counted. The second "and" gate output is also applied through another time delay network 86 similar to the preceding ones and another cathode follower 88 to the nodule marking magnetic recording head 18. The magnetic recording head records a pulse in the nodule channel. The reason for its displacement is that the tape has travelled a small distance in the interim required for the marking apparatus to be operated. Thus the nodule marking pulse is applied adjacent to the location of the nodule. The number of nodules are also counted by the counter. Thus the end product is a tape which has all its nodule locations identified and counted. Of course, if desired, other means of nodule marking may be employed, such as an actual ink marking, so that visual identification may be made. The tape may then be spliced, with the imperfect portion cut out. Otherwise, with a magnetic nodule marking, it is well within the skill of one versed in the art to require that the nodule channel be read in advance of writing on the tape. The output from the nodule channel can then be used to prevent writing until the imperfect portion of the tape has passed by. Another and also a preferred embodiment of the invention is to place the nodule marking head slightly in advance of the nodule along the direction of motion and to use in place of the time delay univibrator 86 a pulse generator such as a multivibrator which is biased to oscillate only upon application of a pulse and for a desired short interval thereafter. Thus a nodule is marked by a train of pulses which commences slightly in advance of the occurrence thereof under a reading head and which lasts until it has passed the reading head.

Figure 2:
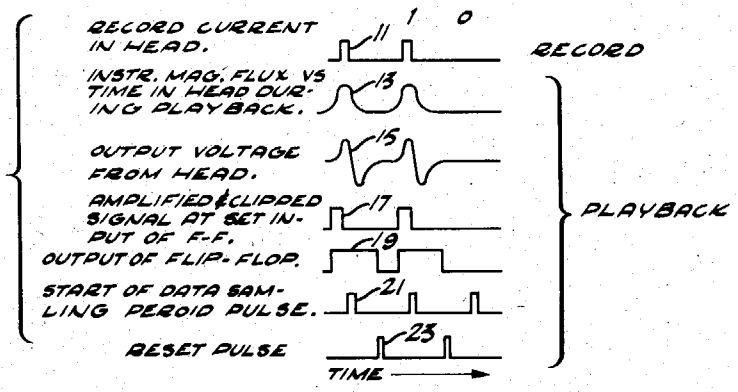
Figure 2 is a diagram of the wave shapes which are obtained at various portions of the circuit shown in Figure 1 and which are shown herein, in order to provide a better understanding of the operation of this invention.

Reference is made to Figure 2, wherein waveforms are shown which illustrate the operation of the system. Assume, as shown by the first waveform 11, that three pulses have been recorded in the three channels, but the third channel has a nodule, and, therefore, no pulse is recorded transversely with the two pulses in the other two data channels. The magnetic flux in the transducer head during playback is shown as the second curve 13 of Figure 2. The output voltage from the transducer head will have the waveform 15 shown in the third curve. The output of the slicer will be the rectangular pulses 17 shown in the fourth curve, and the flip-flop will provide the pulses 19 as shown in the sixth curve. The data sampling pulse shown by the seventh curve 21 occurs during the interval of the existence of the outputs from the flip-flops. Accordingly, it is during this interval that the data "and" gates will provide an output. The first "and" gate will not provide an output in view of the fact that all of its inputs are not present. Accordingly, the second "and" gate will pass a pulse from the first pulse generator which serves to provide a marking pulse transversely aligned on the tape with the defective portion of the data channels. The reset pulse shown by the last curve 23 occurs at a short time after the data sampling pulse and serves to reset the flip-flops so they may be in condition for indicating the next signals coming under the magnetic transducer heads.

If the signals read by the magnetic transducer heads do not occur simultaneously as a result either of the skew of the tape or of the misalignment of the recording heads (not shown), then the first "and" gate will not provide an output and the indication is of the same type (noninhibiting) as if a nodule had occurred. By increasing the delay of the first variable time delay network, the data sampling pulse can be further delayed until an output is provided from the first "and" gate. Thus there is available a means of compensating for tape skew. There is also available a means for determining the extent of the tape skew since the amount of delay required in order to permit the first "and" gate to operate and inhibit the second "and" gate can be readily measured. When this is considered together with the rate of tape travel, the amount of tape skew can be easily computed.

Although the system is here shown and described as one wherein the location of the nodules are identified by a pulse in the nodule channel, this also can be performed by marking a pulse everywhere along the nodule channel except where a nodule occurs in the data channels. Thus the presence of the nodule is identified as the absence of a pulse. This can be accomplished by omitting the inverter in Figure 1 and changing the second "and" gate to be the same type as the first "and" gate.

It will be appreciated that the present invention is employed where recording of closely spaced pulses on tape is desired, but not so closely spaced as to smear together so that the pulses cannot be treated as discrete units. Furthermore, if the test recording is made with large gaps between test pulses, the large gaps will remain untested and the system will provide accurate results only if the laying down of pulses is subsequently performed in the same regions as the ones in which the original test pulses were laid down. The usual defects typically effect pulses over about 25 to 50 miles of tape and with the present recording systems between five and ten pulses are usually packed in that space.

The lower limit setting of the slicer 32 can be employed, to a certain extent, to increase or decrease the number of nodules or tape imperfections marked by the subject invention. The nodules on a tape are characterized not only by losing 100 percent of the signal recorded thereover but also by causing a considerable reduction in amplitude of the recorded signal. Therefore, a determination should be made of the minimum amplitude signal to be tolerated on readout and the slicing level should be adjusted accordingly.

Accordingly, there has been described and shown above a system for identifying, counting, and marking on tape the location of nodules so that tapes which have heretofore been deemed not usable for accurate recording and reproducing are now made usable. Also, compensation for tape skew and the measurement thereof is now afforded by means of the above described system. The defect marking system herein obviously may also be employed with magnetic drums and other magnetic recording mediums wherein recording is made in the manner described above.

I claim:

1. Apparatus for testing a magnetic recording medium employed in a system wherein said recording medium has a plurality of parallel data tracks, and a separate magnetic transducer head is positioned over each of said tracks, said apparatus comprising means to record substantially transversely aligned pulses in all said data tracks, a means for each channel to generate a signal indicative of one of said aligned pulses being read by the transducer for that channel, means to generate a data sampling pulse after a desired interval responsive to output from any one of said means to generate a signal, means responsive to a coincident output from all said means to generate a signal for each channel to generate a coincidence indicating pulse, and means responsive to a data sampling pulse and to the absence of a coincidence indicating pulse to mark said magnetic recording medium at the location of the pulses which fail to generate a coincidence indicating pulse.

2. Apparatus as recited in claim 1 wherein said means to generate a data sampling pulse after a desired interval includes an adjustable time delay network to permit determination of the extent of skew of said magnetic recording medium.

3. Apparatus for testing a magnetic recording medium employed in a system wherein said recording medium has a plurality of parallel data tracks, and a separate magnetic transducer head is positioned over each of said tracks, said apparatus comprising, means to record substantially transversely aligned pulses in all said data tracks, a flip-flop circuit for each channel having a non-indicating and an indicating state, means to couple each head to an associated flip-flop to drive it to an indicating state upon reading one of said pulses, means to generate a data sampling pulse after a desired interval responsive to any one of said flip-flops being driven to an indicating state, means responsive to a coincidence of all said flip-flop circuits being in said indicating state to generate a coincidence indicating pulse, means responsive to a data sampling pulse and the absence of a coincidence indicating pulse to mark said recording medium at the location of the pulses which fail to provide a coincidence indicating pulse, and means responsive to a data sampling pulse to reset said flip-flops after a predetermined interval to their nonindicating state.

4. Apparatus as recited in claim 3 wherein said means to generate a data sampling pulse after a desired interval includes an adjustable time delay network and a first pulse generator coupled to receive output therefrom, and said means responsive to a data sampling pulse to reset said flip-flops includes a second time delay network coupled to receive output from said first pulse generator and a second pulse generator coupled to receive output from said second time delay network.

5. Apparatus for testing a magnetic recording medium employed in a system wherein said recording medium has a plurality of parallel data tracks and a separate magnetic transducer head is positioned over each of said data tracks, all of said heads being substantially aligned, said apparatus comprising means to record substantially transversely aligned pulses in all said data tracks, a flip-flop circuit for each channel having a non-indicating and an indicating state, means to couple each head to an associated flip-flop to drive it to an indicating state upon reading one of said pulses, a first and second "and" gate, an "or" gate, means to apply the outputs of all said flip-flops when in an indicating state as inputs to said first "and" gate and to said "or" gate, a first and second pulse generator, means including a first delay network to apply the output from said "or" gate to said first pulse generator to generate a data sampling pulse responsive thereto, a second time delay network, means to apply said data sampling pulse to said second "and" gate and said second time delay network, means to couple said first "and" gate output to said second "and" gate, means to mark the portion of said recording medium which has just been read responsive to an output from said second "and" gate, means to inhibit the operation of said means to mark responsive to an output from said first "and" gate, means to apply the output of said second time delay network to said second pulse generator to generate a pulse responsive thereto, and means to apply said second pulse generator output to all said flip-flops to reset them to their nonindicating condition.

6. Apparatus as recited in claim 5 wherein said means to couple each head to an associated flip-flop includes for each head an amplifier, and network means to limit the output of said amplifier between an upper and lower limit.

*7. Apparatus for detecting and indicating the presence of a defect in a longitudinal recording medium wherein data is stored as a plurality of transverse arrays of magnetic information bits at each of a number of predetermined locations in each of said arrays, said arrays being disposed longitudinally along said medium, said medium including an index track disposed longitudinally thereof for magnetically storing index markers; comprising means responsive to all bits of any one of said arrays for detecting a defect in any one of said predetermined locations of said one array and for producing a first output signal whenever a defect is detected thereby, means responsive to any one of said bits of said one array for providing a second output signal, and means responsive to the simultaneous occurrence of said first and second output signal for producing a third output signal to control the recording of an index marker at a position along said index track which corresponds to the longitudinal position of said one array.*

*8. Apparatus for producing a substantially simultaneous delivery of a plurality of signals corresponding respectively to the binary digits stored in representative form in a transverse recording position on a recording medium provided with a plurality of substantially parallel information storage tracks, said medium being employed in a system wherein each of an array of transducer heads is positioned opposite a respective one of said tracks and wherein relative motion is provided between said heads and said medium in a direction substantially parallel to said tracks; comprising, a plurality of bistable devices each having two stable states and operable upon receipt of the output signals from a respective one of said transducer heads to assume the stable state corresponding to the stored binary digit passing the corresponding head at that instant, a delay signal generator coupled to all of said bistable devices and responsive to the first of said bistable devices to assume a predetermined stable state when a transverse recording position on said recording medium reaches said array of heads for generating a sampling signal after a predetermined delay, and means coupled to said delay signal generator and to each of said bistable devices and responsive to said sampling signal for delivering substantially simultaneously a plurality of signals each representing the state of a respective one of said bistable devices when said sampling signal occurs.*

*9. Apparatus as in claim 8 further including means coupled to all of said bistable devices and responsive to said sampling signal for resetting all of said bistable devices to a common predetermined stable state after said sampling signal is generated.*

References Cited in the file of this patent or the original patent

UNITED STATES PATENTS

| | | |
|---|---|---|
| 2,528,290 | Wiegand | Oct. 31, 1950 |
| 2,528,682 | Blaney | Nov. 7, 1950 |
| 2,628,346 | Burkhart | Feb. 10, 1953 |
| 2,817,829 | Lubkin | Dec. 24, 1957 |